May 22, 1956 — E. F. HISCOCK — 2,746,376
COFFEE MAKERS
Original Filed Feb. 6, 1950
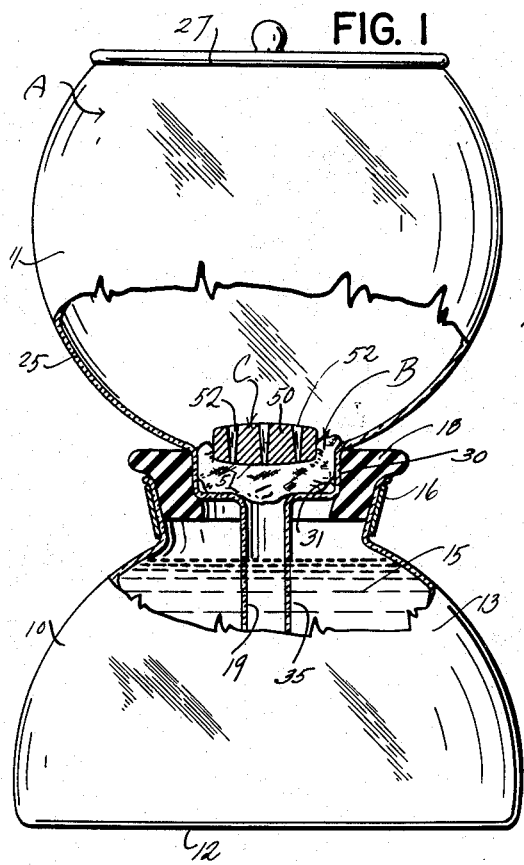
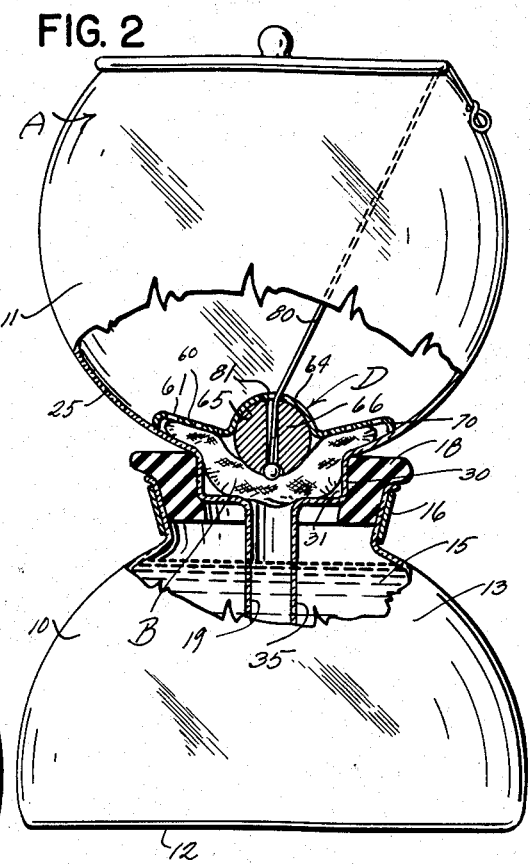
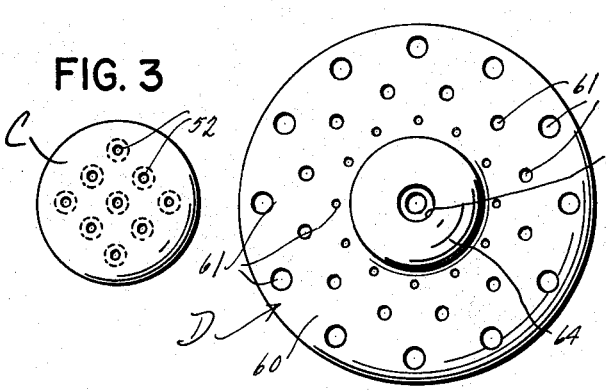
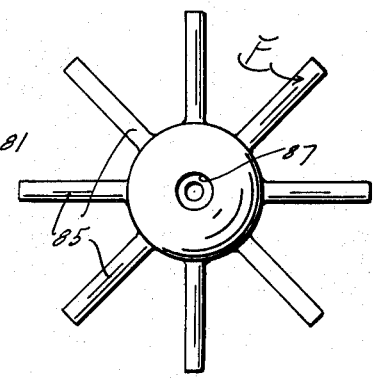
INVENTOR.
Earle F. Hiscock
BY
Lancaster, Allwine & Rommel
Attorneys

United States Patent Office 2,746,376
Patented May 22, 1956

2,746,376
COFFEE MAKERS

Earle F. Hiscock, Chatham, Mass., assignor to Kip, Inc., Chatham, Mass., a corporation of Delaware Original application February 6, 1950, Serial No. 142,670. Divided and this application March 13, 1953, Serial No. 342,190

6 Claims. (Cl. 99—295)

This invention relates to improvements in means for brewing coffee, and other beverages, etc.

The primary object of this invention is the provision of an improved vacuum type coffee maker wherein weighted means is used in connection with a porous coffee retaining packet or unit under such circumstances as to efficiently control brewing action for the economic production of a clear and clean beverage.

A further object of this invention is the provision of an improved vacuum type coffee maker utilizing in the communicating area between the upper and lower receptacle compartments a weighted porous packet containing comminuted coffee, under such conditions that during the brewing action upward surge of liquor will cause the weight to have a bouncing and squeezing action upon the packet and the coffee therein for the economical extraction of the desirable beverage taste providing constituents.

Other objects and advantages of this invention will be apparent during the course of the following detailed description.

In the accompanying drawing, forming a part of this specification and wherein similar reference characters designate corresponding parts throughout the several views:

Fig. 1 is a side elevation, partly in section, of a vacuum type coffee maker, showing an improved coffee containing porous packet held in brewing position by means of a squeeze action type of weight placed over the major area thereof.

Fig. 2 is a partly sectional view of a vacuum type coffee maker with a modified form of coffee packet holding means.

Fig. 3 is a bottom plan view of the packet holding weight shown in Fig. 1.

Fig. 4 is a top plan view of the coffee packet holding device shown in Fig. 2.

Fig. 5 is a plan view of a modified form of packet holder, which may be used in lieu of the weights shown in Figs. 1, 3 and 4.

In the drawing, wherein for the purpose of illustration are shown different forms of the invention, the letter A may generally designate a coffee maker adapted to use a porous coffee containing packet B. Preferably the material in this packet is some infusible substance, such as coffee, tea, etc. A weight C is used upon the packet B within the vacuum type coffee maker, during the brewing of the coffee. Modified forms of weights D and E may be used in lieu of the weight C.

The coffee packets may be constructed as set forth in my co-pending application Serial No. 142,670, filed February 6, 1950 (now abandoned), of which the present application is a division, and also as shown in my co-pending application Serial No. 281,354, filed April 9, 1952. Suffice to say that it is flexible and porous and receives the comminuted substance therein, such as coffee, under circumstances permitting the liquid, during brewing action, to pass therethrough and through the coffee for the extraction of the beverage providing constituents thereof.

The coffee maker A may be of the usual type comprising a lower receptacle portion 10 and an upper receptacle portion 11. These receptacle portions are preferably fabricated of heat resistant plastic, glass or other material. The lower receptacle portion 10 includes a flat bottom wall 12 having upwardly convergent dome shaped walls 13 defining a compartment 14 adapted to receive boiling water or coffee liquor, designated at 15 in the drawings. The neck 16 of the receptacle 10 is reduced and supports a heat resistant and insulating plastic or synthetic rubber nipple or seat 18 having a passageway therethrough.

The upper receptacle portion 11 includes a main bowl 25 of substantial spherical shape, although the shape can vary, defining a compartment therein open at the top of the receptacle for receiving a detachable closure 27, if so preferred. At its lower end the bowl portion 25 has integrally formed therewith a coffee unit receiving well 30 defining a socket 31 of circular horizontal cross section for receiving the packet B. The well portion 30 has the usual depending tube 35 integrally connected therewith, having a passageway 19 therethrough. The well 30 snugly seats in the passageway of the insulation nipple 18, and the tube 35 extends into the compartment 14 of the lower receptacle portion 10 in usual manner.

The member C is preferably constructed of material which will give it the most effective weight, according to the size of the coffee maker and the packet, to best function, as will hereinafter be mentioned. It may be constructed of any material, preferably non-corrosive, such as stainless steel, heavy plastic, etc. As shown in Fig. 3, it is circular, having convex upper and lower surfaces 50 and 51. It is provided with a plurality of passageways 52 therethrough which taper convergently from the upper surface 50 towards the lower surface thereof. The diameter of the member C is appreciably less than that of the diameter of the socket 31 so that during ebullition the rising and falling weight will not appreciably contact the coffee maker walls.

In the form of packet holding construction D, a disc-shaped body portion 60 may be provided, having perforations 61 therein of varying size. These openings are preferably smaller in diameter at the central portion of the disc 60 and respectively increasing in diameter outwardly towards the outer circumference of the disc. The center portion 64 is segmentally bulged to provide a downwardly facing socket 65 for receiving a weight 66, preferably in spherical form. The weight 66 may be attached to the disc 60 in the position shown in Fig. 2, or it may be detachable. The periphery 62 of the disc may be downwardly flanged at 70, as shown in Fig. 2, for engaging the inner walls of the receptacle portion 11, as shown in Fig. 2, in order to space the disc body from the receptacle. The packet D may rest in the well or socket 31 and even extend upwardly therefrom and overlap the inner walls of the spherical portion 25 of the upper part of the coffee maker, as shown in Fig. 2. The disc 60 is of such nature as to completely cover the packet.

To facilitate insertion and removal of the coffee pack retaining structure D, a flexible string or cable 80 is provided, inserted loosely through an opening 81 in the disc 60 and weight 66. This string is of sufficient length to extend exteriorly of the coffee maker, as shown in Fig. 2, to facilitate insertion and removal. The weight rests upon the packet B, as shown in Fig. 2, and functions as will be hereinafter described.

In the form of coffee pack and weight retaining structure E, I may provide radially extending spring arms 85 secured to the hub structure, the latter being weighted similarly to that of the form of construction D or otherwise. The construction E may have a passageway 87 therethrough for a cable similar to that shown in Fig. 2.

The construction above described for the brewing of liquor from infusible material has two principal ends. First, to secure the highest efficiency in brewing action upon the infusible material, and second, to secure a flavorable liquor, which in the case of coffee will retain a maximum of the original aromatic principles, without foreign tastes.

It is to be noted that the weight member either covers all of the top of the packet or the major area thereof, in position for exerting a squeeze action upon the packet and substantially all of the infusible material therein. It has been found that the action of the weight or member holding the packet against too free upward movement resists the upward surge of vapor and liquor during the brewing action. The weight is bounced upon the top of the coffee packet and thus mechanically speeds the extraction of the aromatic beverage materials, etc. from the ground coffee within the packet. It thus acts with an intermittent pressing and squeezing action upon the infusible material, as will be obvious from the foregoing. In addition, the weight serves as a lateral deflector to the upward surges of hot water and vapor; the vapor rapidly condensing as it enters the upper bowl, and causes the fluid to pass horizontally through the packet as well as transversely therethrough. Furthermore, when the vacuum action takes place, the downward surge of the brew passes through the passages of the weight and through the porous packet, and for those types of weights which do not entirely cover the packet the liquor will also pass around the outside of the weight and also through the packet. The liquor around the weight passes into the outer edges of the packet and then laterally towards the center of the well to reach the tube. Obviously, the relationship between the diameter of the packet, well and the lower nearly horizontal surface of the well, the diameter of the weight and the size of the packet are all factors in designing a coffee maker which will operate with maximum efficiency. In the coffee maker shown with the weight C, the well could be in the proportion of 4" in diameter to a weight 2" in diameter although this is not to be considered as restrictive. The perforations in the weight construction may be shaped to have more resistance to upward flow of the liquor and vapor than the downward flavor extracting flow of the liquor. One such variation is shown in Fig. 2, where the passageways 52 are tapered.

The force exerted upon the packet resists the upward surges of water and vapor. This downward force in its simplest and easiest form is exerted by means of the weights C, D and E. I have in mind spring action force urged against the pack which will yield under the pressure exerted by the upward surge of the liquor and vapor.

Other types of vacuum makers than that shown in the drawing may be used to brew coffee utilizing the resistance force of a weight or spring to enchance the brewing action.

Various changes in the shape, size and arrangement of parts shown and described herein may be made to the form of invention without departing from the spirit of the invention or scope of the claims.

I claim:

1. In a vacuum type coffee maker the combination of upper and lower receptacle portions having a tube connection between them provided with a passageway and which tube projects into the lower receptacle portion below the normal level of liquid therein, said passageway being opened to the upper and lower compartments of the receptacles, a packet comprising a permeable flexible casing with comminuted coffee entirely confined therein and of a size to lie entirely over the passageway connecting the receptacle portions of the coffee maker and disposed in such location that vapor and liquid from the lower receptacle will necessarily pass through the tube passageway and through the permeable casing, and a member mounted in engagement with the major area of said packet immediately above the passageway of said tube provided with openings therein for passage of vapor and liquid therethrough and of a weight sufficient to hold the packet downwardly over the tube passageway to entirely cover the same and lift to a predetermined degree, under the upward surge of liquor passing through the tube from the lower receptacle compartment into the upper receptacle compartment, whereby during the brewing action to produce an intermittent squeezing of the packet and the coffee contents thereof.

2. A vacuum type coffee maker as claimed in claim 1 wherein the said member includes a central weight portion disposed directly over the top of the tube passageway and a lateral portion overlying the outer marginal portions of the packet, and which lateral portion is provided with transverse liquid passageways therethrough.

3. A vacuum type coffee maker as defined in claim 1 wherein the said member includes a central weighted portion adapted to directly overlie the upper passageway portion of the tube and having laterally extending relatively spaced spring arms adapted to resiliently engage the outer marginal portions of the packet thereunder.

4. In a vacuum type coffee maker the combination of upper and lower receptacles having chambers therein, a tube mounted at the juncture of said chambers having a passageway therethrough and projecting into the lower receptacle below the normal liquid level therein, said passageway opening into both chambers and communicating said chambers with each other, a flexible filter packet comprising comminuted coffee encased in a permeable casing and disposed in said upper receptacle chamber immediately over the chamber communicating passageway of said tube so that vapor and liquid from the lower receptacle chamber must pass through the tube passageway and enter the permeable casing and its coffee contents, and means mounted upon said packet and its coffee contents and engaging and acting with a yielding force to press said packet and its coffee contents downwardly so that under the influence of upward surges of liquor and vapor and return passage of the liquor to said lower chamber said means will be lifted and lowered to act with a pressing and squeezing action on said packet and its coffee contents during brewing action.

5. A vacuum type coffee maker as defined in claim 4 wherein the means normally forcing the packet and its coffee contents downwardly is provided with openings therethrough to permit the passage of liquor back and forth through said openings and through said packet.

6. In a vacuum type coffee maker the combination of upper and lower receptacle portions having individual chambers therein and a communicating tube provided with a passageway which connects the two chambers, said tube extending into the upper portion of the lower chamber, a packet of coffee including a permeable flexible casing having comminuted coffee disposed therein, said packet of coffee being located in the upper receptacle portion and covering the passageway through the tube, and yieldable means in the upper chamber engaging and compressing the coffee packet and its contents over the major top area of the coffee packet in such position, said yieldable means exerting such a degree of compressive force upon the packet and coffee contents as will be overcome under the force of upward surge of liquor through the passageway during coffee brewing whereby said yieldable means will exert a bouncing and squeezing action upon the packet and its coffee contents.

References Cited in the file of this patent

UNITED STATES PATENTS

| | | |
|---|---|---|
| 386,817 | Harry | July 31, 1888 |
| 785,693 | Brown | Mar. 21, 1905 |
| 871,492 | Dunlap | Nov. 19, 1907 |
| 1,083,900 | Brown | Jan. 6, 1914 |
| 1,335,048 | Diefendorf | Mar. 30, 1920 |
| 1,454,739 | Holland | May 8, 1923 |
| 1,751,397 | Delsuc | Mar. 18, 1930 |
| 1,876,474 | Starkey | Sept. 6, 1932 |
| 2,071,919 | Cory | Feb. 23, 1937 |
| 2,227,540 | Fry | Jan. 7, 1941 |
| 2,289,498 | Hons | July 14, 1942 |
| 2,370,096 | Walder et al. | Feb. 20, 1945 |
| 2,460,735 | Carroll | Feb. 1, 1949 |

FOREIGN PATENTS

| | | |
|---|---|---|
| 417,281 | Germany | Aug. 11, 1925 |
| 529,724 | France | Sept. 15, 1921 |